May 25, 1965 B. BÁRTFAI ET AL 3,185,591
SILVER ELECTRODE OF SILVER-ZINC STORAGE CELLS AND
PROCESS FOR PREPARING THEM
Filed Nov. 1, 1960

Béla Bártfai
Miklós Bártfai
Jenő Gönczi
László Hajdu
Márton Markovics
Béla Ronai
Jozsef Szücs
   INVENTORS.

BY
THEIR AGENT

3,185,591
SILVER ELECTRODE OF SILVER-ZINC STORAGE CELLS AND PROCESS FOR PREPARING THEM

Béla Bártfai, Miklós Bártfai, Jenö Gönczi, László Hajdu, Márton Markovics, Béla Ronai, and József Szücs, all of Budapest, Hungary, assignors to Metrimpex Magyar Muszeripari Kulkereskedelmi Vallalat, Budapest, Hungary
Filed Nov. 1, 1960, Ser. No. 67,873
Claims priority, application Hungary, June 7, 1960, BA 1,458
5 Claims. (Cl. 136—75)

This invention relates to the silver electrode of silver-zinc storage cells and to the process for their preparation.

It is known that the positive electrodes of silver-zinc storage cells are prepared of silver powder or silver oxide powder by pressing the powder round the terminal wire. In case of satisfactorily high pressure, the electrode has adequate strength and the terminal wire pressed into the electrode ensures sufficient contact; however, only about 15–20 percent of the active material takes part in the current producing process because the electrolyte cannot penetrate into the inner parts of the electrode.

By using low pressure it can be achieved that the whole quantity of the active material takes part in the depolarization process but in this case the electrode falls to pieces in a short time, the pressed-in terminal wire does not ensure satisfactory contact, and after some cycles the storage cell deteriorates.

To eliminate these disadvantages, the use of thin silver electrodes prepared with high pressure has been proposed but this proposition proved to be not satisfactory in practice because it makes necessary the use of numerous electrodes the separation of which cannot be solved in a safe way. A further drawback of this proposition consists in the fact that all these electrodes must be provided with separate terminal wires which occupy a great part of the available inner space of the cell.

Thus it can be seen that the silver electrodes prepared with the methods known hitherto of the silver-zinc storage cells present many disadvantages. We have found that not only these drawbacks can be eliminated but also the capacity of the positive electrode of silver-zinc storage cells can be increased if the electrochemically active silver oxide layer is prepared, instead of the electrochemical formation of silver powder or silver oxide powder pressed round a terminal metal wire, by forming a silver oxide layer on a silver metal core.

The invention relates to the silver electrode of silver-zinc storage cells, comprising a silver metal core serving as support and terminal wire, and a silver oxide layer of a quantity ranging from 4 to 80 percent related to said silver metal core, said silver oxide layer coating said core being connected with said core by chemical bond and forming a physically homogeneous body with said core.

Silver plates, ribbons, wires, tubes or other silver bodies of any kind can be used as silver core if these bodies can be shaped to the desired form of the positive electrodes of silver-zinc storage cells.

A process for producing the silver electrode according to the invention consists in preparing a silver oxide layer on a silver metal core by electrolytic chlorination of the silver metal to silver chloride, subsequent reduction of the silver chloride to silver, and electrolytic oxidation of the reduced silver to silver oxide.

A great advantage of the silver electrode according to the invention as against the silver electrodes known hitherto consists in the fact that it ensures a reliable contact between the active material and the silver metal core serving as support and terminal wire. This reliable contact does not get deteriorated even in case of higher cycle numbers. A further advantage of the electrode according to the invention is its high specific capacity amounting to about 100 milliampere-hours/milliliter as against that of the positive silver electrodes prepared with the known methods. This high capacity is due to the fact that the electrochemical process takes place in the whole cross-section of the layer transformed to oxide of the silver electrode. Thus, the efficiency of the depolarization process is improved and the rate of gas evolution taking place on the positive electrode while charging and discharging, respectively, is decreased. Consequently, the positive electrode according to the invention can very advantageously be used in hermetically sealed silver-zinc storage cells, e.g., in the so-called button-cells too.

The process serving for preparing the silver electrode according to the invention is explained in connection with the annexed drawing and by the aid of the following examples.

Example 1

Figure 1:
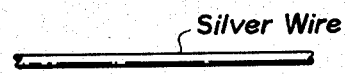
FIG. 1 is the drawing of a silver wire of circular cross-section to be used for preparing the positive electrode according to the invention.
Figure 2:
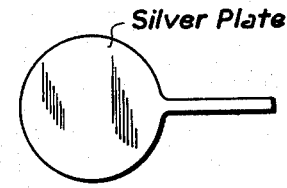
FIG. 2 is the top plan view of a silver plate to be used for preparing the positive electrode according to the invention.
Figure 3:
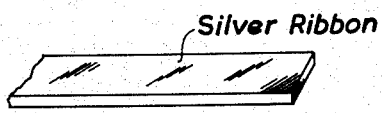
FIG. 3 is a silver ribbon to be used for preparing the positive electrode according to the invention.
Figure 4:
FIG. 4 is the section of a silver tube of circular cross-section to be used for preparing the positive electrode according to the invention.
Figure 5:
FIG. 5 is a waved silver wire to be used for preparing the positive electrode according to the invention.
Figure 6:
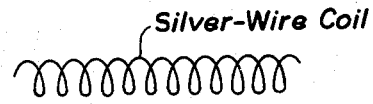
FIG. 6 is a coiled silver wire to be used for preparing the positive electrode according to the invention.
Figure 7:
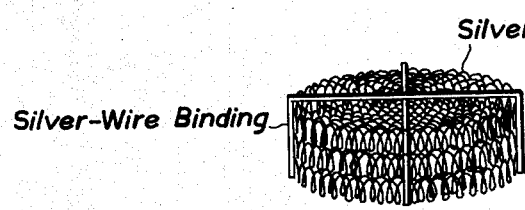
FIG. 7 is a coiled silver wire coil fixed by binding with silver wire, to be used for preparing the positive electrode according to the invention.

From a silver wire of 0.15 mm. diameter, a spiral of about 0.8 mm. diameter is prepared. This spiral is wound to a coil with the desired shape and dimensions of the silver electrode. The coil is fixed by binding with silver wire. Then the electrode is chlorinated by connecting as anode in a 10% sodium chloride solution, using a silver cathode, and with a current of 20 ma. calculated to 1 gram weight of the silver electrode, 200 milliampere-hours of direct current per 1 gram electrode weight are passed through it. After washing the electrode with water, it is discharged in 40% potassium hydroxide solution containing 1–2% potassium zincate, through a constant resistance, with a zinc plate as counter electrode. Then the silver electrode is connected as anode and the zinc plate as cathode, and the silver electrode is oxidized with a current of 30 ma. calculated to 1 gram electrode weight, and altogether 200 milliampere-hours per 1 gram electrode weight are passed through the electrode. After discharging through a constant resistance, the electrode is charged again. After charging, the electrode contains about 65% silver oxide calculated to the original weight of the positive silver electrode. The electrode thus obtained can be built into storage cells.

Example 2

The method described in Example 1 is followed but instead of silver wire a silver ribbon having 1 mm. width and 0.2 mm. thickness is used.

Example 3

A silver wire of 0.15 mm. diameter is waved and coiled to a silver electrode of desired shape and dimensions. Further on the method of Example 1 is followed.

What we claim is:
1. A method of making a silver/silver-oxide electrode for an alkaline storage cell, comprising the steps of electrolytically transforming an outer zone of a homogeneous body of solid metallic silver along its surface into silver chloride surrounding a core of solid metallic silver, reducing said silver chloride to produce discrete active particles of metallic silver along said surface integral with the material of said core, and oxidizing said particles to silver oxide, thereby producing a layer of said silver oxide substantially integral with said core.

2. A method of making a silver/silver-oxide electrode for an alkaline storage cell, comprising the steps of electrolytically transforming an outer zone of a homogeneous body of solid metallic silver along its surface into silver chloride surrounding a core of solid metallic silver, reducing substantially all of said silver chloride to produce discrete particles of metallic silver along said surface integral with the material of said core, and oxidizing said particles to silver oxide, thereby producing a layer of said silver oxide substantially integral with said core.

3. A method of making a silver/silver-oxide electrode for an alkaline storage cell, comprising the steps of electrolytically transforming an outer zone of a homogeneous body of solid metallic silver along its surface into silver chloride surrounding a core of solid metallic silver, reducing said silver chloride to produce discrete particles of metallic silver along said surface integral with the material of said core, and electrolytically oxidizing said particles to silver oxide, thereby producing a layer of said silver oxide substantially integral with said core.

4. A method of making a silver/silver-oxide electrode for an alkaline storage cell, comprising the steps of electrolytically transforming an outer zone of a homogeneous body of solid metallic silver along its surface into silver chloride surrounding a core of solid metallic silver, reducing substantially all of said silver chloride to produce discrete particles of metallic silver along said surface integral with the material of said core, and electrolytically oxidizing said particles to silver oxide, thereby producing a layer of said silver oxide substantially integral with said core.

5. A method of making a silver/silver-oxide electrode for an alkaline storage cell, comprising the steps of electrolytically transforming an outer zone of helically coiled silver wire along its surface into silver chloride surrounding a core of solid metallic silver, reducing substantially all of said silver chloride to produce discrete particles of metallic silver along said surface integral with the material of said core, and electrolytically oxidizing said particles to silver oxide, thereby producing a layer of said silver oxide substantially integral with said core.

References Cited by the Examiner
UNITED STATES PATENTS

| | | | |
|---|---|---|---|
| 2,669,595 | 2/54 | Gary | 136—30 |
| 2,849,519 | 8/58 | Freas et al. | 136—120 |
| 2,850,555 | 9/58 | Pucher et al. | 136—20 |
| 2,945,078 | 7/60 | Chapman et al. | 136—30 |
| 3,006,821 | 10/61 | Haring | 136—120 |

JOHN H. MACK, *Primary Examiner.*

JOHN R. SPECK, MURRAY TILLMAN, *Examiners.*